United States Patent Office 3,438,966
Patented Apr. 15, 1969

3,438,966
MONOAZO-DYESTUFFS
Karl Ronco and Willy Mueller, Riehen, Switzerland, assignors to Ciba Limited, Basel, Switzerland, a Swiss company
No Drawing. Filed Mar. 4, 1965, Ser. No. 437,298
Claims priority, application Switzerland, Mar. 13, 1964, 3,297/64; Feb. 1, 1965, 1,332/65
Int. Cl. C09b 29/20
U.S. Cl. 260—204      6 Claims The present invention provides monoazo dyestuff pigments of the formula (1) 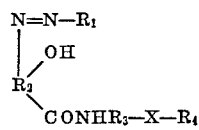

in which $R_1$ represents a benzene radical containing a trifluoromethyl group, $R_2$ represents a naphthalene radical in which the azo, hydroxy and carboxylic acid amide groups are in 1, 2, 3-position, $R_3$ represents a phenylene radical, $R_4$ represents an aryl radical, for example, a naphthalene radical, but more especially a benzene radical, and X represents a carboxylic acid amide group.

Since the dyestuffs of the invention are to be in the form or pigments, they naturally must not contain groups imparting solubility in water, especially acidic groups imparting solubility in water, for example, sulfonic or carboxylic acid groups.

The new dyestuffs may be obtained when (a) a carboxylic acid halide free from acidic groups imparting solubility in water and corresponding to the formula (2) 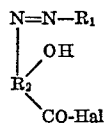

in which $R_1$ has the meaning given above, $R_2$ represents a naphthalene radical in which the azo, hydroxy and carboxylic acid halide groups are in 1, 2, 3-position, is condensed with a monoamine free from acidic groups imparting solubility in water and corresponding to the formula (3)      $H_2N—R_3—X—R_4$ in which $R_3$, $R_4$ and X have the meanings given above or, (b) a diazo compound of a trifluoromethylaniline is coupled with a naphthol of the formula (4) 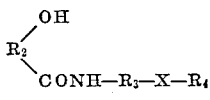

or (c) a diazo compound of a trifluoromethylaniline is coupled with a naphthol of the formula

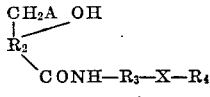

in which A represents the radical of an amine and $R_2$, $R_3$, $R_4$ and X have the meanings given above.

Specially valuable dyestuffs are obtained when a carboxylic acid chloride of the formula (6) 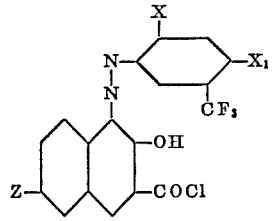

in which X represents a halogen atom or an alkoxy group or a phenoxy group that may be substituted, $X_1$ represents a hydrogen or halogen atom and Z represents a hydrogen or halogen atom or an alkoxy group, is condensed with an amine of the formula (7) 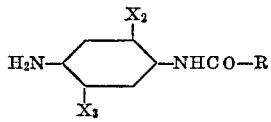

especially an amine of the formula (8) 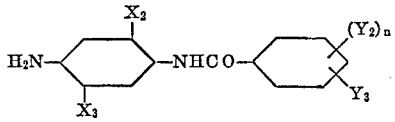

in which formulae R represents a benzene, naphthalene or thiophene radical, $X_2$ and $X_3$ represent hydrogen or halogen atoms, trifluoromethyl, alkyl or alkoxy groups, $Y_2$ represents a hydrogen or halogen atom or an alkyl or alkoxy group, $Y_3$ represents a hydrogen or halogen atom or a carboxylic acid ester, cyano, acylamino or a phenyl group and $n$ represents 1 or 2.

The carboxylic acids on which the chlorides of the Formula 6 are based are obtainable by coupling a diazo compound of an amine of the formula (9) 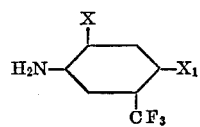

in which X and $X_1$ have the meanings given above, for example, 2-chloro-5-trifluoromethylaniline or 2:4-dichloro-5-trifluoromethylaniline, with a 2:3-hydroxynaphthoic acid of the formula

(10) 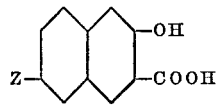

in which Z represents a hydrogen or halogen atom or an alkoxy group.

The azo-carboxylic acids so obtained are treated with agents capable of converting carboxylic acids into their halides, for example, chlorides or bromide, especially with phosphorus halides, for example, phosphorus pentabromide, phosphorus trichloride or phosphorus pentachloride or phosphorus oxyhalides and preferably with thionyl chloride.

The treatment with acid halogenating agents of the kind defined is advantageously carried out in an inert organic solvent, for example, dimethylformamide, a chlorobenzene, for example, monochlorobenzene or dichlorobenzene, toluene, a xylene or nitrobenzene. If necessary, dimethylformamide may be added when using the last five named solvents.

When preparing the carboxylic acid halides it is generally advantageous to dry the azo compound which has been prepared in aqueous medium, or to free it from water by azeotropic distillation in an organic solvent. If desired, the said azeotropic drying may be effected immediately prior to the treatment with the acid halogenating agent.

The azo dyestuff carboxylic acid chlorides may be condensed, for example, with the following amines:

4-benzoylamino-aniline,
2:5-dichloro-4-benzolyamino-aniline,
2:5-dichloro-4-(4′-chlorobenzoylamino)-aniline,
2:5-dichloro-4-(2′:4′-dichlorobenzoylamino)-aniline,
2:5-dichloro-4-(2′:5′-dichlorobenzoylamino)-aniline,
2:5-dichloro-4-(4′-methylbenzoylamino)-aniline,
2:5-dichloro-4-(4′-phenylbenzoylamino)-aniline,
2:5-dimethyl-4-benzolyamino-aniline,
2:5-dimethyl-4-(4′-chlorobenzoylamino)-aniline,
2:5-dimethyl-4-(2′:4′-dichlorobenzoylamino)-aniline,
2:5-dimethyl-4-(2′:5′-dichlorobenzoylamino)-aniline,
2:5-dimethyl-4-(4′-methylbenzoylamino)-aniline,
2:5-dimethyl-4-(4′-phenylbenzoylamino)-aniline,
2:5-dimethyl-4-(4′-methoxybenzolyamino)-aniline,
2-chloro-5-methyl-4-benzoylamino-aniline,
2-chloro-5-methyl-4-(4′-chlorobenzoylamino)-aniline,
2-chloro-5-methyl-4-(2′:5′-dichlorobenzoylamino)-aniline,
2-chloro-5-methyl-4-(4′-methylbenzoylamino)-aniline,
2-chloro-5-methyl-4-(4′-phenylbenzoylamino)-aniline,
2-methoxy-5-chloro-4-(benzoylamino)-aniline,
2-methoxy-5-chloro-4-(4′-chlorobenzoylamino)-aniline,
2-methoxy-5-chloro-4-(2′:5′-dichlorobenzoylamino)-aniline,
2-methoxy-5-chloro-4-(4′-methylbenzoylamino)-aniline,
2-methoxy-5-chloro-4-(4′-phenylbenzoylamino)-aniline,
4-(4′-carbomethoxy)-benzoylamino-aniline,
2:5-dichloro-4-(4′-carbethoxy)-benzoylamino-aniline,
2:5-dimethyl-4-(4′-carbomethoxy)-benzoylamino-aniline,
4-(4′-chloro)-benzoylamino-aniline,
4-(4′-methyl)-benzoylamino-aniline,
4-(4′-methoxy)-benzoylamino-aniline,
4-(3′-acetylamino)-benzoylamino-aniline,
4-(4′-phenyl)-benzoylamino-aniline, Dyestuffs that are equally valuable are obtainable by condensing a carboxylic acid chloride of the formula (11)

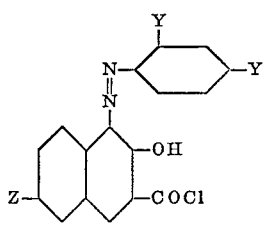

in which one Y, preferably the one in ortho-position to the azo group represents a nitro group and the other Y represents a trifluoromethyl group, and Z represents a hydrogen or halogen atom or an alkoxy group, with an amine of the formula (12)

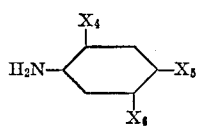

in which $X_4$ represents a hydrogen or halogen atom or an alkyl, alkoxy, alkylmercapto or an aliphatic acylamino group, $X_5$ represents a hydrogen or halogen atom or a group of the formula (13)

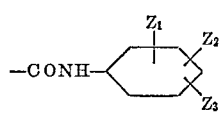

in which $Z_1$, $Z_2$ and $Z_3$ represent hydrogen or halogen atoms, alkyl, alkoxy, nitro, trifluoromethyl, cyano, carbamide, carbalkoxy, carbophenoxy or carbobenzyloxy groups, it also being possible for two of the radicals $Z_1$, $Z_2$ and $Z_3$ to represent a fused benzene nucleus, $X_6$ represents a hydrogen atom or preferably a radical of the Formula 13, in which case only one of the substituents $X_5$ or $X_6$ represents a radical of the Formula 13.

The azo dyestuffs on which the chlorides of the Formula 11 are based are obtainable by coupling a diazo compound of 2-nitro-4-trifluoromethylaniline with a 2:3-hydroxynaphthoic acid of the Formula 10. The carboxylic acid chlorides may be prepared in the manner described above, and may be condensed, for example, with the following amines:

4-chloro-3-aminobenzoic acid-(2′:5′-dichloro)-anilide,
4-methoxy-3-aminobenzoic acid-(2′:5′-dichloro)-anilide,
4-chloro-3-aminobenzoic acid-(3′-trifluoromethyl)-anilide,
4-chloro-3-aminobenzoic acid-(2′:5′-dimethyl-4′-chloro)-anilide,
5-amino-2:4-dichlorobenzoic acid-(3′-trifluoromethyl)-anilide,
4-chloro-3-aminobenzoic acid-(5′-trifluoromethyl-2′-chloro)-anilide,
4-methoxy-3-aminobenzoic acid-(5′-trifluoromethyl-2′-chloro)-anilide,
4-chloro-3-aminobenzoic acid-(5′-carbomethoxy-2′-chloro)-anilide,
4-methoxy-3-aminobenzoic acid-(5′:8′-dichloro-α-naphthyl)-amide,
4-methoxy-3-aminobenzoic acid-(5′-carbomethoxy-2′-chloro)-anilide,
4-chloro-3-aminobenzoic acid-(2′:5′-dimethyl-4′-chloro)-anilide,
4-chloro-3-aminobenzoic acid-(3′:5′-ditrifluoromethyl)-anilide,
4-chloro-3-(4′-chloro-3′-amino)-benzoylaminobenzoic acid phenylester,
4-chloro-3-(4′-chloro-3′-amino)-benzoylaminobenzoic acid-4″-chlorophenyl ester,
5-(4′-chloro-3′-amino)-benzoylamino-2:4-dichlorobenzoic acid phenyl ester,
5-(4′-chloro-3′-amino)-benzoylamino-2:4-dichlorobenzoic acid benzyl ester,
5-(4′-chloro-3′-amino)-benzoylamino-2:4-dichlorobenzoic acid-4″-chlorophenyl ester,
5-(4′-chloro-3′-amino)-benzoylamino-2:4-dichlorobenzoic acid-4″-chlorobenzyl ester,
4-chloro-3-(4′-chloro-3′-amino)-benzoylaminobenzoic acid-4″-chlorobenzyl ester,
4-chloro-3-(4′-chloro-3′-amino)-benzoylaminobenzoic acid-4″-methoxybenzyl ester.

Condensation between the carboxylic acid halides of the kind defined above and the amines is advantageously carried out in an anhydrous medium. Under such conditions it generally proceeds surprisingly quickly at the boiling temperatures of the common organic solvents, for example, toluene, monochlorobenzene, dichlorobenzene, trichlorobenzene, nitrobenzene and the like. In order to accelerate the reaction it is generally advantageous to add an agent capable of binding acid, for example, anhydrous sodium acetate or pyridine. Some of the dyestuffs so obtained are crystalline and some amorphous and they are generally obtained in a very good yield and in a pure state. It is advantageous to isolate the acid chlorides obtained from the carboxylic acids but in some cases, however, this can be omitted without harm and condensation carried out immediately after the formation of the carboxylic acid chlorides.

In method (b) of the process of the invention, the new dyestuffs may be obtained when a diazo compound of a trifluoromethylaniline, especially one of the Formula 9 is coupled with a naphthol of the formula (14)

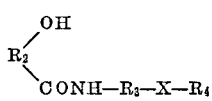

in which $R_2$, $R_3$ and $R_4$ have the meanings given above, preferably a naphthol of the formula (15)

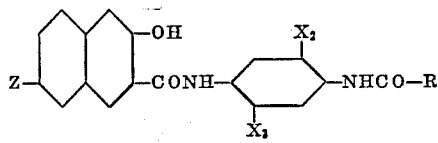

in which $X_2$, $X_3$, R and Z have the meanings given above.

Coupling is advantageously carried out in a manner such that an acidic solution of the diazonium salt is coupled continuously with an alkaline solution of the coupling component in a mixture nozzle, coupling taking place immediately. Care must be taken to ensure that diazo component and coupling component are present in the mixing nozzle in equimolecular amounts. The simplest method of doing this is to control the pH value of the liquid in the mixing nozzle. It must also be ensured that the two solutions are violently agitated in the mixing nozzle. The dyestuff dispersion that is formed is drawn off from the mixing nozzle continuously and the dyestuff is isolated by filtration.

In method (c) of the process of the invention the new dyestuffs are obtainable by coupling a diazo compound of a trifluoromethylaniline with a naphthol of the formula (16)

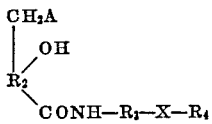

in which A represents the radical of an amine and $R_2$, $R_3$, $R_4$ and X have the meanings given above.

In the compounds of Formula 16 A advantageously represents the radical of an amine of the formula (17)

in which $R_5$ represents a hydrogen atom or an alkyl radical and $R_6$ represents an alkyl radical, the two radicals $R_5$ and $R_6$ also being capable of forming a heterocyclic ring together with the nitrogen atom. As examples there may be mentioned the radicals of methylamine, dimethylamine, diethylamine, diethanolamine, pyrrolidine, piperidine and morpholine. The compounds of the Formula 16 are obtainable by reacting the compounds of the Formula 14 with formaldehyde and a primary or secondary amine.

During coupling the radical —$CH_2A$ is split off and replaced by the azo group. Coupling is advantageously carried out in an acid medium.

The new dyestuffs are valuable pigments that can be used for a very wide variety of purposes. For example, they can be used in a state of fine division for the spin-dyeing of filament and staple fiber viscose rayon, cellulose ethers and esters, polyamides, polyurethanes and polyesters, as well as in the preparation of colored lacquers and as lake formers. They may also be used for coloring solutions and products made from cellulose acetate, nitrocellulose, natural and synthetic resins, for example, polymerization and condensation resins, for example, aminoplasts, alkyd resins, phenoplasts, polyolefines, for example, polystyrene, polyvinyl chloride, polyethylene, polypropylene, polyacrylonitrile, rubber, casein, silicones and silicone resins. They can also be used with advantage in the preparation of colored pencils, cosmetics and laminated sheet material.

Compared with the dyestuffs described in French specification No. 784,220 granted Apr. 29, 1935 to Imperial Chemical Industries Limited, Manchester, England, and in United States specification No. 1,947,550 granted Feb. 20, 1934 to Emmet F. Hitch, Wilmington, Del., U.S.A., which differ from those of the invention in that the residue $R_1$ does not contain a trifluoromethyl group, the dyestuffs of the invention possess a better fastness to migration and to overstripe bleeding.

The following examples illustrate the invention. Unless otherwise stated, the parts and percentages are by weight.

EXAMPLE 1

168 parts of the dyestuff obtained by diazotising 5-trifluoromethyl-2-chloro-1-aminobenzene in aqueous hydrochloric acid and sodium nitrite and coupling with 2:3-hydroxynaphthoic acid were mixed with 3,000 parts of benzene, 70 parts of thionyl chloride and 5 parts of dimethylformamide and heated for one hour at 75 to 80° C. while stirring. After cooling the reaction mixture, the homogeneous crystalline monocarboxylic acid chloride of the dyestuff was isolated by filtration, washed with cold benzene and dried in vacuo at 50 to 60° C.

8.3 parts of the acid chloride in admixture with 6.3 parts of 2:5-dimethyl-4-(4'-carbomethoxy)-benzoyl-amino-aniline and 600 parts of ortho-dichlorobenzene were heated for 14 hours at 140 to 145° C. The crystalline, sparingly soluble pigment was then isolated from the hot reaction mixture by filtration, washed successively with hot ortho-dichlorobenzene, boiling alcohol and hot water and then dried in vacuo at 70 to 80° C.

The dyestuff obtained, which corresponded to the formula

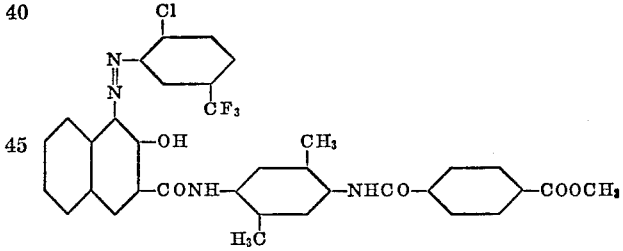

was a red pigment sparingly soluble to insoluble in the common solvents which colored polyvinyl chloride film and lacquers scarlet tints possessing an excellent fastness to light, migration and overstripe bleeding.

The azo dyestuff monocarboxylic acids obtainable from the mononuclear diazo components listed in Column I of the following table and the coupling components in Column II can be reacted in the manner described in the first and second paragraphs above via the monoazo dyestuff monocarboxylic acid chlorides with 1 mol of the aromatic binuclear monoamines listed in Column III. The tints produced in polyvinyl chloride film with the pigments obtained are listed in Column IV.

| I | II | III | IV |
|---|---|---|---|
| 1. 2-chloro-5-trifluoromethyl-aniline. | 2:3-hydroxynaphthoic acid. | $H_2N$—⬡(Cl)—NHCO—⬡(Cl) | Red-orange. |
| 2. do. | do. | $H_2N$—⬡(Cl)—NHCO—⬡(Cl)—COOCH₃ | Scarlet. |

| | I | II | III | IV |
|---|---|---|---|---|
| 3 | 2-chloro-5-trifluoromethyl-aniline. | 2:3-hydroxynaphthoic acid | H₂N—(Ph)(CH₃)—NHCO—(Ph) | Red. |
| 4 | do | do | H₂N—(Ph)—NHCO—(Ph)—COOCH₃ | Scarlet. |
| 5 | do | do | H₂N—(Ph)(CH₃)(CH₃)—NHCO—(Ph)—Cl | Do. |
| 6 | do | do | H₂N—(Ph)(Cl)(OCH₃)—NHCO—(Ph)—COOCH₃ | Do. |
| 7 | do | do | H₂N—(Ph)(Cl)(Cl)—NHCO—(Ph)—Cl | Do. |
| 8 | do | do | H₂N—(Ph)(Cl)(Cl)—NHCO—(Ph)(Cl)(Cl) | Do. |
| 9 | do | do | H₂N—(Ph)(CH₃)(CH₃)—NHCO—(Ph)(Cl)(Cl) | Do. |
| 10 | do | do | H₂N—(Ph)—NHCO—(Ph) | Do. |
| 11 | do | do | H₂N—(Ph)(CH₃)(CH₃)—NHCO—(Ph)(Cl)(Cl) | Do. |
| 12 | do | do | H₂N—(Ph)(Cl)(Cl)—NHCO—(Ph)—(Ph) | Do. |
| 13 | do | do | H₂N—(Ph)(CH₃)(CH₃)—NHCO—(Ph)—OCH₃ | Do. |
| 14 | do | do | H₂N—(Ph)(CH₃)(CH₃)—NHCO—(Ph)—(Ph) | Do. |
| 15 | do | do | H₂N—(Ph)(Cl)(OCH₃)—NHCO—(Ph)—(Ph) | Do. |
| 16 | do | do | H₂N—(Ph)(Cl)(Cl)—NHCO—(naphthyl) | Red. |
| 17 | do | do | H₂N—(Ph)(Cl)(Cl)—NHCO—(Ph)—CH₃ | Scarlet. |

| | I | II | III | IV |
|---|---|---|---|---|
| 18 | 2-chloro-5-trifluoromethyl-aniline. | 2:3-hydroxynaphthoic acid | H₂N—⟨CH₃⟩—NHCO—⟨⟩ | Scarlet. |
| 19 | 2:4-dichlorotrifluoromethyl-aniline. | ....do.... | H₂N—⟨CH₃/H₃C⟩—NHCO—⟨⟩ | Red. |
| 20 | ....do.... | ....do.... | H₂N—⟨CH₃/H₃C⟩—NHCO—⟨⟩—Cl | Red. |
| 21 | ....do.... | ....do.... | H₂N—⟨CH₃/H₃C⟩—NHCO—⟨⟩—⟨⟩ | Red. |
| 22 | ....do.... | ....do.... | H₂N—⟨CH₃/H₃C⟩—NHCO—⟨⟩⟨⟩ (naphthyl) | Red. |
| 23 | ....do.... | ....do.... | H₂N—⟨Cl/Cl⟩—NHCO—⟨⟩—⟨⟩ | |
| 24 | 2-chloro-5-trifluoromethyl | 6-bromo-2:3-hydroxy-naphthoic acid. | H₂N—⟨CH₃/H₃C⟩—NHCO—⟨⟩—Cl | Red. |
| 25 | 2-chloro-5-trifluoromethyl-aniline. | ....do.... | H₂N—⟨CH₃/H₃C⟩—NHCO—⟨⟩ | Red. |
| 26 | ....do.... | ....do.... | H₂N—⟨CH₃/H₃C⟩—NHCO—⟨⟩—OCH₃ | Red. |
| 27 | ....do.... | ....do.... | H₂N—⟨CH₃/H₃C⟩—NHCO—⟨⟩—⟨⟩ | Red. |
| 28 | ....do.... | ....do.... | H₂N—⟨⟩—NHCO—⟨⟩ | Red. |
| 29 | ....do.... | ....do.... | H₂N—⟨⟩—NHCO—⟨⟩—⟨⟩ | Red. |
| 30 | ....do.... | ....do.... | H₂N—⟨⟩—NHCO—⟨⟩⟨⟩ (naphthyl) | Red. |
| 31 | 4-chloro-2-trifluoromethyl-aniline. | 2:3-hydroxynaphthoic acid | H₂N—⟨CH₃/H₃C⟩—NHCO—⟨⟩ | Orange. |
| 32 | ....do.... | ....do.... | H₂N—⟨⟩—NHCO—⟨⟩ | Do. |

| | I | II | III | IV |
|---|---|---|---|---|
| 33 | 4-chloro-2-trifluoromethylaniline. | 2,3-hydroxynaphthoic acid | H₂N–⬡(CH₃)(H₃C)–NHCO–⬡–⬡ | Orange. |
| 34 | do | do | H₂N–⬡–NHCO–⬡(⬡) | Reddish-orange. |
| 35 | do | 2,3-hydroxy naphthoic acid | H₂N–⬡(Cl)(Cl)–NHCO–⬡(⬡) | Red. |
| 36 | 4-nitro-2-trifluoromethylaniline. | do | H₂N–⬡–NHCO–⬡–COOCH₃ | Brown. |
| 37 | do | do | H₂N–⬡–NHCO–C(=CH)–S–C(=CH)–COOCH₃ | Red-brown. |
| 38 | 2-methoxy-5-trifluoromethylaniline. | do | H₂N–⬡(CH₃)(H₃C)–NHCO–⬡ | Red. |
| 39 | 2-(parachlorophenoxy)-5-trifluoromethylaniline. | do | H₂N–⬡–NHCO–⬡–COOCH₃ | Scarlet. |
| 40 | 2-methoxy-5-trifluoromethylaniline. | do | H₂N–⬡–NHCO–⬡ | Do. |
| 41 | do | do | H₂N–⬡(CH₃)(H₃C)–NHCO–⬡–Cl | Do. |
| 42 | do | do | H₂N–⬡(CH₃)(H₃C)–NHCO–⬡(Cl) | Red. |
| 43 | do | do | H₂N–⬡–NHCO–⬡–⬡ | Scarlet. |
| 44 | do | do | H₂N–⬡–NHCO–⬡–CH₃ | Do. |
| 45 | 2-chloro-5-trifluoromethylaniline. | 6-methoxy-2,3-hydroxynaphthoic acid. | H₂N–⬡(Cl)(Cl)–NHCO–⬡ | Red. |
| 46 | do | do | H₂N–⬡(CH₃)(H₃C)–NHCO–⬡–Cl | Red. |
| 47 | do | do | H₂N–⬡–NHCO–⬡ | Red. |
| 48 | do | do | H₂N–⬡–NHCO–⬡–Cl | Red. |
| 49 | do | 2,3-hydroxynaphthoic acid | H₂N–⬡–NHCO–⬡–CH₃ | Scarlet. |
| 50 | do | do | H₂N–⬡–NHCO–⬡–⬡ | Do. |
| 51 | do | do | H₂N–⬡–NHCO–⬡–OCH₃ | Do. |

| | I | II | III | IV |
|---|---|---|---|---|
| 52 | 2-chloro-5-trifluoromethylaniline. | 2,3-hydroxynaphthoic acid | $H_2N-\bigcirc-NHCO-\bigcirc-Cl$ | Scarlet. |
| 53 | 2-methoxy-5-trifluoromethylaniline. | ....do.... | $H_2N-\bigcirc(Cl)(Cl)-NHCO-\bigcirc-Cl$ | Red. |
| 54 | 2-(p-chloro-phenoxy)-5-trifluoromethylaniline. | ....do.... | $H_2N-\bigcirc-NHCO-\bigcirc$ | Scarlet. |
| 55 | ....do.... | ....do.... | $H_2N-\bigcirc-NHCO-\bigcirc-Cl$ | Red. |
| 56 | 2-nitro-4-trifluoromethylaniline. | ....do.... | $H_3CO,\ H_2N-\bigcirc-CONH-\bigcirc(Cl)(COOCH_3)$ | Orange. |
| 57 | ....do.... | ....do.... | $H_2N-\bigcirc(Cl)-CONH-\bigcirc-COOCH_3$ | Do. |
| 58 | ....do.... | ....do.... | $H_2N-\bigcirc(Cl)(Cl)-CONH-\bigcirc(Cl)-COOCH_3$ | Do. |
| 59 | ....do.... | ....do.... | $H_2N-\bigcirc(Cl)(Cl)-CONH-\bigcirc(Cl)-Cl$ | Do. |
| 60 | ....do.... | ....do.... | $H_2N-\bigcirc(Cl)(Cl)-CONH-\bigcirc(Cl)-Cl$ | Do. |
| 61 | ....do.... | ....do.... | $H_3C,\ H_2N-\bigcirc-CONH-\bigcirc(Cl)(Cl)$ | Do. |
| 62 | ....do.... | ....do.... | $H_3C,\ H_2N-\bigcirc-CONH-\bigcirc(Cl)-COOCH_3$ | Do. |
| 63 | ....do.... | ....do.... | $H_3CO,\ H_2N-\bigcirc-CONH-\bigcirc(CF_3)(CF_3)$ | Do. |

| | I | II | III | IV |
|---|---|---|---|---|
| 64 | 2-nitro-4-trifluoromethyl-anilene. | 2,3-hydroxynaphthoic acid | H₃C–⟨⟩–CONH–⟨⟩(CF₃)(CF₃), with H₂N on first ring | Orange. |
| 65 | 4-nitro-2-trifluoromethyl-aniline. | ....do.... | H₃CO–⟨⟩(H₂N)–CONH–⟨⟩(CF₃)(CF₃) | Do. |
| 66 | ....do.... | ....do.... | H₃CO–⟨⟩(H₂N)–(Cl)–CONH–⟨⟩(CF₃) | Do. |
| 67 | ....do.... | ....do.... | H₃CO–⟨⟩(H₂N)–CONH–⟨⟩(H₃CO)(OCH₃)(Cl) | Do. |
| 68 | ....do.... | ....do.... | H₃CO–⟨⟩(H₂N)–(Cl)–CONH–⟨⟩(Cl)(COOCH₃) | Do. |
| 69 | ....do.... | ....do.... | H₃CO–⟨⟩(H₂N)–(Cl)–CONH–⟨⟩(CF₃) | Do. |
| 70 | ....do.... | ....do.... | ⟨⟩(Cl)(H₂N)–CONH–⟨⟩(CF₃) | Do. |
| 71 | ....do.... | ....do.... | H₃C–⟨⟩(H₂N)–CONH–⟨⟩(Cl)(Cl) | Do. |
| 72 | ....do.... | ....do.... | ⟨⟩(Cl)(H₂N)–CONH–⟨⟩(COOC₂H₅) | Do. |
| 73 | ....do.... | ....do.... | ⟨⟩(Cl)(H₂N)–CONH–⟨⟩(COOC₂H₅) | Do. |

| | I | II | III | IV |
|---|---|---|---|---|
| 74 | 2-nitro-4-trifluoromethyl-aniline. | 2,3-hydroxynaphthoic acid | H₂N—⌬—CONH—⌬(Cl)(CF₃) | Scarlet. |
| 75 | do | do | H₂N—⌬—CONH—⌬(Cl)(CH₃) | Do. |
| 76 | do | do | H₂N—⌬—CONH—⌬(Cl)(Cl) | Do. |
| 77 | do | 6-bromo-2,3-hydroxy-naphthoic acid. | H₃CO—⌬(H₂N)—CONH—⌬(Cl)(COOCH₃) | Do. |
| 78 | do | do | H₂N—⌬(Cl)—CONH—⌬(Cl)(COOCH₃) | Do. |
| 79 | do | do | H₂N—⌬(Cl)—CONH—⌬(Cl)(CF₃) | Do. |
| 80 | do | 2,3-hydroxynaphthoic acid | H₃CO—⌬(H₂N)—CONH—naphthyl(Cl)(Cl) | Red. |
| 81 | do | do | H₂N—⌬(Cl)—CONH—⌬(CH₃)(Cl)(CH₃) | Orange. |
| 82 | do | do | H₃CS—⌬(H₂N)—CONH—⌬(CF₃) | Do. |
| 83 | do | do | H₂N—⌬(Cl)—CONH—⌬(Cl)(CF₃) | Do. |
| 84 | do | do | H₃CO—⌬(H₂N)—CONH—⌬(Cl)(CF₃) | Do. |

| | I | II | III | IV |
|---|---|---|---|---|
| 85 | 2-nitro-4-trifluoromethyl-aniline. | 2,3-hydroxynaphthoic acid | $H_2N-\underset{CONH-}{\overset{Cl}{\bigcirc}}-\underset{COOCH_3}{\overset{Cl}{\bigcirc}}$ | Orange. |
| 86 | ...do... | 6-bromo-2:3-hydroxy-naphthoic acid. | $H_2N-\underset{CONH-}{\overset{H_3CO}{\bigcirc}}-\underset{CF_3}{\overset{CF_3}{\bigcirc}}$ | Do. |
| 87 | ...do... | ...do... | $H_2N-\underset{CONH-}{\overset{Cl}{\bigcirc}}-\overset{Cl}{\bigcirc}-\bigcirc$ | Do. |
| 88 | ...do... | 2,3-hydroxy-naphthoic acid | $H_2N-\underset{CONH-}{\overset{Cl}{\bigcirc}}-\underset{COO-}{\overset{Cl}{\bigcirc}}-\bigcirc$ | Yellow-orange. |
| 89 | ...do... | ...do... | $H_2N-\underset{CONH-}{\overset{Cl}{\bigcirc}}-\underset{COO-}{\overset{Cl}{\bigcirc}}-\bigcirc-Cl$ | Do. |
| 90 | ...do... | ...do... | $H_2N-\underset{CONH-}{\overset{Cl}{\bigcirc}}-\underset{COOCH_2-}{\overset{Cl}{\bigcirc}}-\bigcirc$ | Do. |
| 91 | ...do... | ...do... | $H_2N-\underset{CONH-}{\overset{Cl}{\bigcirc}}-\underset{COOCH_2-}{\overset{Cl}{\bigcirc}}-\bigcirc-Cl$ | Do. |
| 92 | ...do... | ...do... | $H_2N-\underset{CONH-}{\overset{Cl}{\bigcirc}}-\underset{COOCH_3}{\overset{COOCH_3}{\bigcirc}}$ | Do. |
| 93 | ...do... | ...do... | $H_2N-\underset{CONH-}{\overset{Cl}{\bigcirc}}-\underset{CONH_2}{\overset{CONH_2}{\bigcirc}}$ | Do. |

| | I | II | III | IV |
|---|---|---|---|---|
| 94 | 2-nitro-5-chloro-4-trifluoromethylaniline. | 2,3-hydroxynaphthoic acid | [structure: H₂N–(Cl)C₆H₃–CONH–C₆H₃(Cl)(CF₃)] | Orange. |
| 95 | ....do.... | ....do.... | [structure: H₂N–(Cl)C₆H₃–CONH–C₆H₃(Cl)(COOCH₃)] | Do. |
| 96 | ....do.... | ....do.... | [structure: H₂N–(Cl)C₆H₃–CONH–C₆H₃(Cl)(Cl)] | Do. |
| 97 | 2-nitro-4-trifluoromethylaniline. | 2-hydroxy-6-methoxy-3-naphthoic acid. | [structure: H₂N–(Cl)C₆H₃–CONH–C₆H₃(Cl)(Cl)] | Reddish-orange. |
| 98 | ....do.... | ....do.... | [structure: H₂N–(Cl)C₆H₃–CONH–naphthyl(Cl)(Cl)] | Scarlet. |
| 99 | ....do.... | ....do.... | [structure: H₂N–(Cl)C₆H₃–CONH–C₆H₃(CF₃)(CF₃)] | Orange. |
| 100 | ....do.... | ....do.... | [structure: H₂N–(Cl)C₆H₂(Cl)–CONH–C₆H₃(CF₃)(CF₃)] | Do. |
| 101 | ....do.... | ....do.... | [structure: H₂N–(Cl)C₆H₃–CONH–C₆H₃(Cl)(COOCH₂CH₃)] | Do. |
| 102 | ....do.... | ....do.... | [structure: H₂N–(Cl)C₆H₃–CONH–C₆H₂(Cl)(Cl)(COOCH₃)] | Do. |
| 103 | ....do.... | ....do.... | [structure: H₂N–(Cl)C₆H₃–CONH–C₆H₃(Cl)(COOCH₂CH₂Cl)] | Do. |

| | I | II | III | IV |
|---|---|---|---|---|
| 104 | 2-nitro-4-trifluoromethyl-aniline. | 2-hydroxy-6-methoxy-3-naphthoic acid. | H₂N–⌬(Cl)–CONH–⌬(Cl)–COO–⌬ | Yellowish-orange. |
| 105 | ....do.... | ....do.... | H₂N–⌬(Cl)–CONH–⌬(Cl)–COO–⌬–Cl | Do. |
| 106 | 2-chloro-5-trifluoromethyl-aniline. | 2,3-hydroxynaphthoic acid. | H₂N–⌬(Cl)(Cl)–CONH–⌬(Cl)–COOC₂H₅ | Do. |
| 107 | ....do.... | ....do.... | H₂N–⌬(Cl)–CONH–⌬(Cl)–CF₃ | Do. |
| 108 | ....do.... | ....do.... | H₃CO–⌬(H₂N)–CONH–⌬(Cl)–CF₃ | Do. |
| 109 | ....do.... | ....do.... | H₂N–⌬(Cl)–CONH–⌬(Cl)–COOCH₃ | Do. |
| 110 | ....do.... | ....do.... | H₃CO–⌬(H₂N)–CONH–⌬(Cl)–COOCH₃ | Do. |
| 111 | 2-nitro-4-trifluoromethyl-aniline. | ....do.... | H₂N–⌬(Cl)–CONH–⌬(CF₃)(CF₃) | Do. |
| 112 | ....do.... | ....do.... | H₂N–⌬(Cl)–CONH–⌬(Cl)–COO–⌬ | Yellow-orange. |

| I | II | III | IV |
|---|---|---|---|
| 113.... 2-nitro-4-trifluoromethyl-aniline. | 2,3-hydroxynaphthoic acid.... | ![structure with Cl, H2N, CONH, COO, Cl, Cl] | Yellow. orange. |
| 114.... 3-trifluoromethylaniline............. | ....do...................... | H2N-⬡-NHCO-⬡-CH3 | Scarlet. |
| 115.... 3,5-di-trifluoromethyl-aniline. | ....do...................... | H2N-⬡-NHCO-⬡-Cl | Orange. |
| 116.... 2-phenyl-5-trifluoro-methoxyaniline. | ....do...................... | H2N-⬡-NHCO-⬡ | Scarlet. |
| 117.... 2-p-methylphenoxy-5-trifluoromethylaniline. | ....do...................... | H2N-⬡-NHCO-⬡ | Do. |
| 118.... 2-nitro-4-trifluoromethyl-aniline. | ....do...................... | ![structure with Cl, H2N, CONH, Cl, COO, CH3] | Yellowish-brown. |

EXAMPLE 2

9.8 parts of 5-trifluoromethyl-2-chloro-1-amino-benzene were introduced into a mixture of 15.0 parts of ice, 25 parts of 30% hydrochloric acid and 10 parts of glacial acetic acid and the whole stirred for one hour. Ice was added until the temperature was —3° C. and 13.4 parts of 4 N sodium nitride solution were added in the course of 5 minutes so that starch-iodide paper turned a distinct blue; a further 2,6 parts of 4 N sodium nitrite solution were then added dropwise and stirring continued for a further hour at 0 to 5° C. Then an aqueous solution of sulfamic acid was added until the blue coloration on starch-iodide paper disappeared.

In a separated process 22.6 parts of 2-hydroxy-3-naphthoic acid-(4'-benzoylamino-2':5'-dichloro)-phenylamide were dissolved in 50 parts of ethanol, 10 parts of 30% sodium hydroxide solution, 200 parts of water and 100 parts of ethyleneglycol monoethylether. Then 1 part of the product obtained by condensing 8 mols of ethylene oxide and 1 mol of para-tertiary-octylphenol were added to the solution and the naphthol precipitated with 70 parts of glacial acetic acid while stirring well.

Coupling was carried out at a temperature of 35 to 40° C. by the addition of the diazo solution described in the first paragraph the pH value being maintained at 3 to 4. Stirring was continued for 2 hours at the same temperature to complete the coupling, whereupon the pigment suspension so obtained was rendered acid to Congo paper by the addition of hydrochloric acid and the pigment isolated by filtration. The residue was washed with hot water until chloride ions were no longer detectable in the filtrate. After drying in vacuo at 80 to 90° C. a good yield of the red pigment dyestuff of the formula

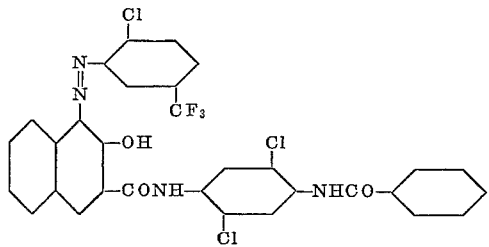

was obtained which colored synthetic materials, for example, polyvinyl chloride and lacquers, red tints and possessing a good fastness to migration, overstripe bleeding and light.

EXAMPLE 3

20.6 parts of 4-trifluoromethyl-2-nitro-1-amino-benzene were suspended in 150 parts of glacial acetic acid; 30 parts of 30% hydrochloric acid were added and diazotization was carried out at 0 to 5° C. with 29 parts of 4 N sodium nitrite. After 30 minutes the batch was diluted with 200 parts of ice-water.

At the same time, 46.8 parts of 4-methoxy-3-(2'-hydroxy-3'-naphthoylamino)-benzoic acid-(2":5"-dichloro)-phenylamide were dissolved in 100 parts of ethanol, 10 parts of 30% sodium hydroxide solution, 200 parts of water and 150 parts of ethyleneglycol monoethylether. Then 1 part of the product obtained by condensing 8 mols of ethylene oxide and 1 mol of para-tertiary octylphenol was added to the solution and the naphthol precipitated in the cold with 100 parts of glacial acetic acid while stirring well.

Coupling was carried out at a temperature of 0 to 10° C. by the addition of the diazo solution described in the first paragrah, the pH value being kept at 3 to 4. Stirring was continued for two hours at 40° C. to complete the coupling, whereupon the pigment suspension so obtained was rendered acid to Congo paper by the addition of hydrochloric acid and filtered. The filter residue was washed with hot water until chlorine ions were no longer detectable in the filtrate.

After drying in vacuo at 80 to 90° C. a good yield was obtained of a red, soft-grained powder very sparingly soluble in organic solvents which colored polyvinyl chloride film an orange tint when incorporated in said film on a roller mill. The coloration possessed a good fastness to migration, overstripe bleeding and light. The product so obtained corresponded to the formula

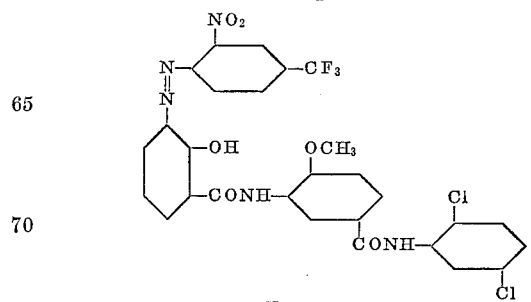

EXAMPLE 4

19.6 parts of 5-trifluoromethyl-2-chloro-1-aminobenzene were diazotized in the manner described in Example 2 and the diazo solution run into a solution of 46 parts of 1-dimethylaminomethyl-2-hydroxy-3-naphthoic acid-[4'(4''-carbomethoxy)-benzoylamino-2':5'-dimethyl]-phenylamide in 3,500 parts of water and 44 parts of 2 N hydrochloric acid at a temperature of 10 to 15° C. The batch was then buffered with sodium acetate solution to a pH value of 4.5 to 5 and stirred for 14 hours at 10 to 20° C. The batch was then suction-filtered, the filter cake washed with water, suspended in 250 parts of 5 N hydrochloric acid, the suspension stirred for one hour at room temperature, filtered, and the filter residue washed with dilute hydrochloric acid and water. The pigment was treated for 2 hours with 700 parts of pyridine in a boiling water bath, filtered hot, washed with pyridine, ethynol and hot water, and then dried in vacuo at 70 to 80° C. A red, soft-grained powder sparingly soluble in organic solvents was obtained which colored polyvinyl chloride film brilliant scarlet tints possessing a very good fastness to migration, overstripe bleeding and light when incorporated in said film on a roller mill. The pigment had the structure indicated in Example 1.

EXAMPLE 5

20.6 parts of 4-trifluoromethyl-2-nitro-1-aminobenzene were diazotized in the manner described in Example 3 and the solution filtered until clear.

In a separate process 50.5 parts of 4-methoxy-3-(2'-hydroxy-3'-naphthoylamino)-benzoic acid - (2'':5''-dichloro)-phenylamide were dissolved cold in a mixture comprising 150 parts of ethyleneglycol monoethylether and 100 parts of 30% sodium hydroxide solution. The two solutions, if necessary, after dilution with water, were conducted continuously into a mixing nozzle where coupling took place immediately. The pH value in the mixing nozzle was kept between 5 and 6 by regulating the supply of the solutions. The temperature must be between 35 and 40° C. and this was regulated by the addition of water to the solutions. The resulting dyestuff suspension was filtered. The filter residue was washed, mixed with a mixture of 20 parts of water, 110 parts of ethyleneglycol monoethylether and 100 parts of orthodichlorobenzene and the whole filtered. The filter residue was washed successively with ethyleneglycol monoethylether and methanol and dried in vacuo at 70 to 80° C. The dyestuff was obtained in almost quantitative yield and corresponded to the product obtained by the process described in Example 3 in respect of tint, purity, state of division and fastness properties.

The dyestuff was obtained in a specially fine state of division when an anionic or non-ionic wetting agent, for example, the sodium salt of N-benzyl-μ-heptadecyl-benzimidazol-disulfonic acid was added to the solution of the diazo or coupling component.

EXAMPLE 6

A mixture was prepared from 65 parts of stabilized polyvinyl chloride, 35 parts of dioctyl phthalate and 0.2 part of the dyestuff obtained in the manner described in the second paragraph of Example 1, and said mixture was worked to and fro for 7 minutes at 140° C. on a two-roller mill. A scarlet film possessing a very good fastness to light and migration was obtained.

What is claimed is:

1. A monoazo dyestuff pigment of the formula

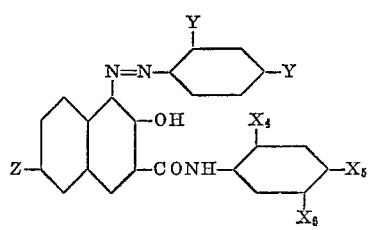

in which one Y represents a nitro group and the other Y represents a trifluoromethyl group, $X_4$ represents a member selected from the group consisting of chlorine and methoxy, one of the substituents $X_5$ and $X_6$ represents a hydrogen or chlorine atom and the other a group of the formula

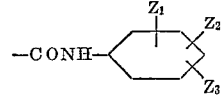

in which $Z_1$, $Z_2$ and $Z_3$ represent members selected from the group consisting of hydrogen, chlorine lower alkoxy, trifluoromethyl, carbamide, lower carbalkoxy, carbophenoxy, carbo-chlorophenoxy, carbo-lower alkylphenoxy and carbobenzyloxy groups, and Z represents a member selected from the group consisting of hydrogen, chlorine, bromine and lower alkoxy group.

2. The dyestuff of the formula

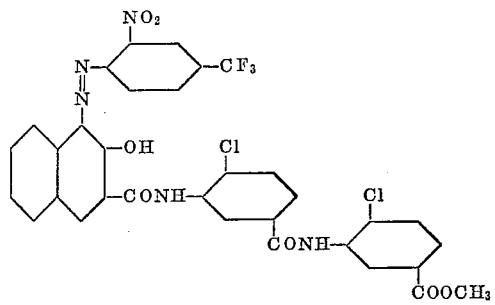

3. The dyestuff of the formula

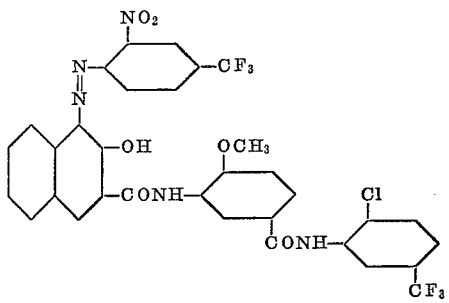

4. The dyestuff of the formula

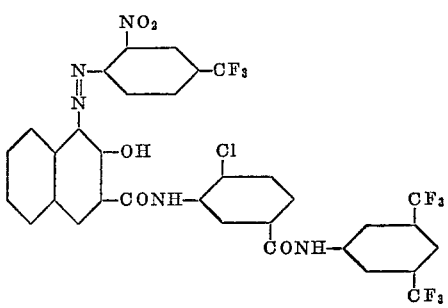

5. The dyestuff of the formula

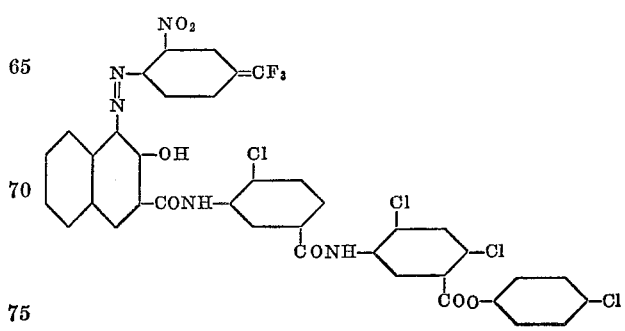

6. The dyestuff of the formula
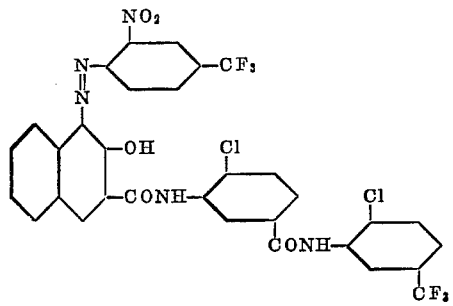
References Cited
UNITED STATES PATENTS
| | | | |
|---|---|---|---|
| 3,113,938 | 12/1963 | Nahaten et al. | 260—203 |
| 3,290,283 | 12/1966 | Ronco | 260—204 |
| 1,947,550 | 2/1934 | Hitch. | |
FOREIGN PATENTS
723,861   1/1932   France.
CHARLES B. PARKER, *Primary Examiner.*
DONALD M. PAPUGA, *Assistant Examiner.*
U.S. Cl. X.R.
8—41, 55; 106—19; 117—121; 167—85; 260—37, 158, 202, 471